United States Patent [19]

Hugentobler

[11] Patent Number: 5,576,953

[45] Date of Patent: Nov. 19, 1996

[54] ELECTRONIC TRANSLATING DEVICE

[76] Inventor: Max Hugentobler, Schwellistrasse 31, CH-8052 Zürich, Switzerland

[21] Appl. No.: 301,920

[22] Filed: Sep. 7, 1994

[30]     Foreign Application Priority Data

Sep. 7, 1993 [CH]   Switzerland ..................... 02656/93

[51] Int. Cl.⁶ ................................... G06F 17/28
[52] U.S. Cl. ........................................ 395/752
[58] Field of Search ................. 364/419.07, 419.02

[56]              References Cited

U.S. PATENT DOCUMENTS

| 4,159,536 | 6/1979 | Kehoe et al. . | |
| 4,393,462 | 7/1983 | Tanimoto et al. | 364/419.07 |
| 4,509,137 | 4/1985 | Yoshida | 364/419.07 |
| 4,551,818 | 11/1985 | Sado et al. | 364/419.07 |
| 4,567,573 | 1/1986 | Hashimoto et al. | 364/419.02 |
| 4,584,667 | 4/1986 | Hashimoto et al. . | |
| 4,623,985 | 11/1986 | Morimoto et al. | 364/419.02 |
| 4,654,798 | 3/1987 | Taki et al. | 364/419.07 |
| 4,698,758 | 10/1987 | Larsen | 364/419.07 |
| 5,136,505 | 8/1992 | Inamori et al. | 364/419.04 |
| 5,210,853 | 5/1993 | Nakasuji et al. | 364/419.11 |
| 5,257,187 | 10/1993 | Suzuki et al. | 364/419.02 |
| 5,373,441 | 12/1994 | Hirai et al. | 364/419.02 |

FOREIGN PATENT DOCUMENTS

| 2946856 | 5/1980 | Germany . |
| 4217271 | 12/1993 | Germany . |
| 2230878 | 10/1990 | United Kingdom . |

*Primary Examiner*—Donald E. McElheny, Jr.
*Attorney, Agent, or Firm*—Speckman, Pauley & Fejer

[57]              ABSTRACT

A portable electronic translating device having an input unit (2), a multi-line display (3) and at least one memory unit. The input unit (2) has a memory key (4), with which a user can store words, sentence fragments or sentences, and their translations, in at least one language. This device can be used as a learning aid for language students, who store their newly learned material in the device and, by entering a previously stored word in one language, obtain the corresponding translation in another language, which they can then memorize.

9 Claims, 3 Drawing Sheets

ELECTRONIC TRANSLATING DEVICE

BACKGROUND OF THE INVENTION

1. Field of the Invention

This invention relates to a portable electronic translating device having an input unit, a multi-line display and at least one memory unit.

2. Description of Prior Art

Electronic translating devices which replace traditional, printed dictionaries are known. U.S. Pat. No. 4,159,536 discloses such a portable electronic translating device. A word to be translated is entered through a keyboard. The entered word is compared with the contents of the memory by a microprocessor. If the memory contains the word, the stored translation of the word is represented on a display. The memory can only be read because it is a Read Only Memory integrated circuit (ROM).

German Patent Disclosure A-29 46 856 also discloses a translating device which operates in a similar manner. However, it also allows a phonetic representation of either the entered or the translated word. The playback can take place acoustically by a loudspeaker or visually by a display.

Conventional translation devices are used in place of a dictionary. They have several advantages over a dictionary. Because, in general, they are of the size of a pocket calculator, i.e. they are small and light, they can be simply packed in a purse or attache case and taken along anywhere. Access to individual words is quicker than with a dictionary, because the search process is performed electronically. The stored contents of the electronic dictionary, however, cannot be changed by the user.

SUMMARY OF THE INVENTION

It is one object of this invention to produce a translation aid having the previously mentioned advantages, but which can also be used as a learning aid.

This object is attained by an electronic translating device having an input unit, a multi-line display and a memory unit, the input unit also having a memory key with which words, fragments of sentences or sentences entered through the input unit can be stored in at least one memory unit. Further, the entered words, sentence fragments or sentences which are present in at least two languages can be allocated with identification keys of the input unit to a memory space which can be identified with the respective language.

This invention, therefore, is a translating device which, similar to conventional electronic dictionaries, compares entered words to already stored words and if they match one another, provides the appropriate translation. However, the translating device according to this invention is not initially a complete dictionary, but instead is filled in the course of the learning process with new words and their translations by the student. For this purpose, the device has an option for storing the newly learned words with a memory key. Also, unlike conventional electronic dictionaries, the device according to this invention not only has a ROM, but also has a Random Access Memory integrated circuit (RAM). Therefore, this invention allows a student to routinely call up the newly entered words along with the already stored words in order to repeat what has already been learned. Thus, the electronic translating device according to this invention is mainly used as a learning aid, with which the student can memorize what has already been learned. This invention assures quick access to all stored data without it being necessary to follow a defined sequence. In this way, the student can pick out a desired word or a desired sentence and ask for the corresponding translation. It is also possible to correct previously entered erroneous translations at any time.

BRIEF DESCRIPTION OF THE DRAWINGS

The previously mentioned and additional features and objects of this invention will be better understood from the following detailed description taken in conjunction with the drawings, wherein.

DESCRIPTION OF PREFERRED EMBODIMENTS

Figure 1:
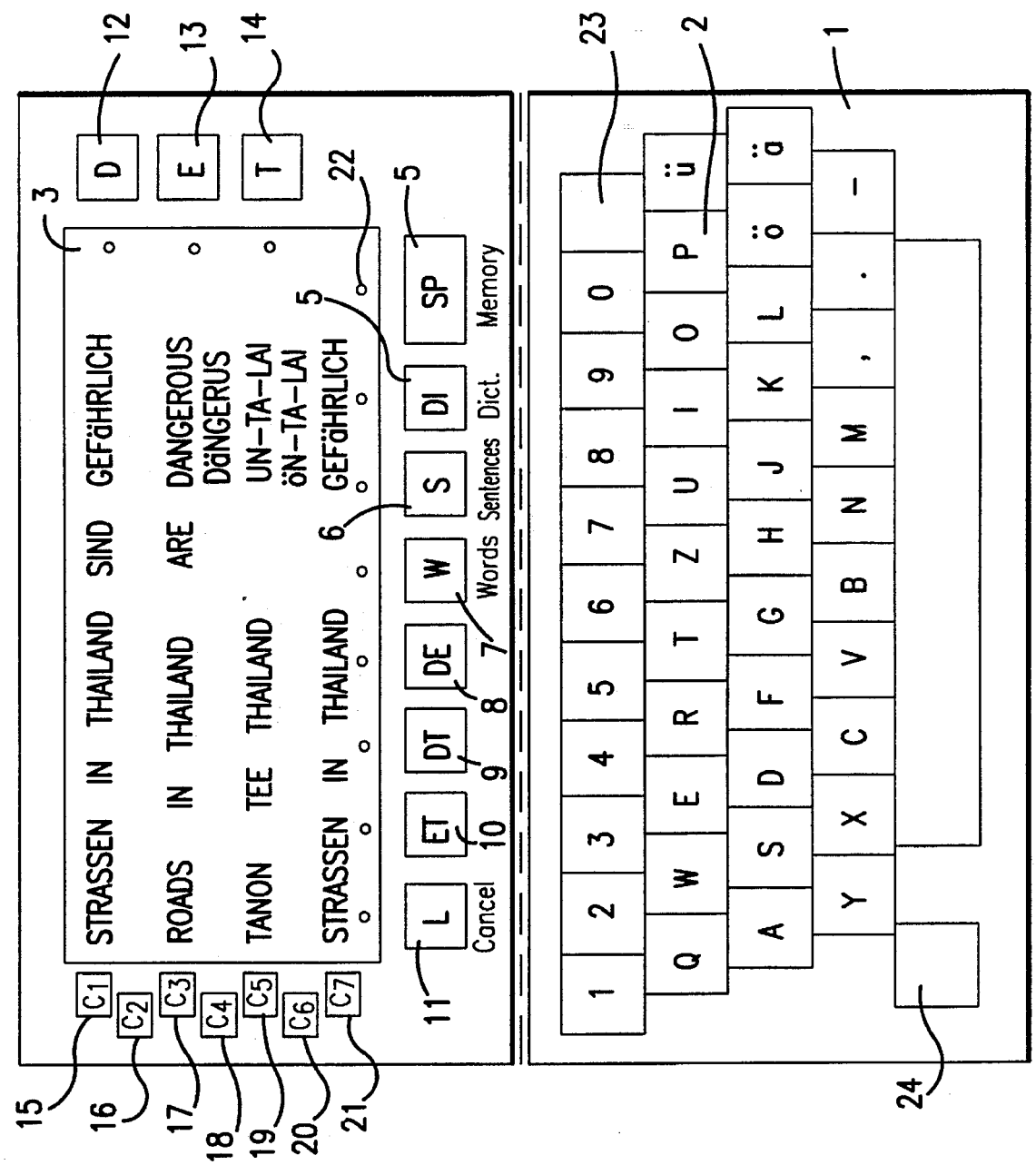
FIG. 1 shows a schematic representation of an electronic translating device in accordance with one preferred embodiment of this invention.
Figure 2A:
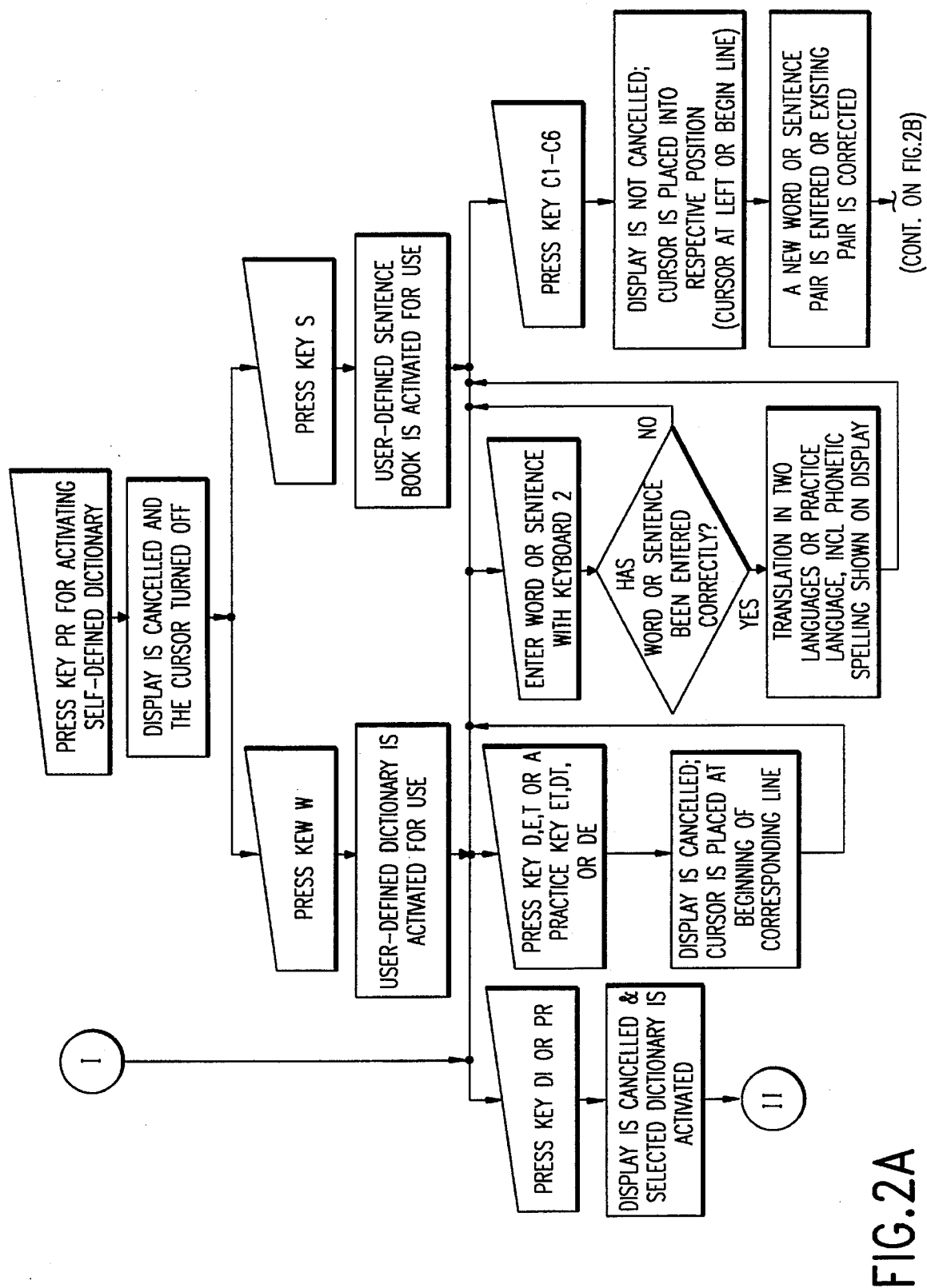
FIGS. 2A and 2B show a flow chart for operating an electronic translating device in accordance with this invention.
Figure 2B:
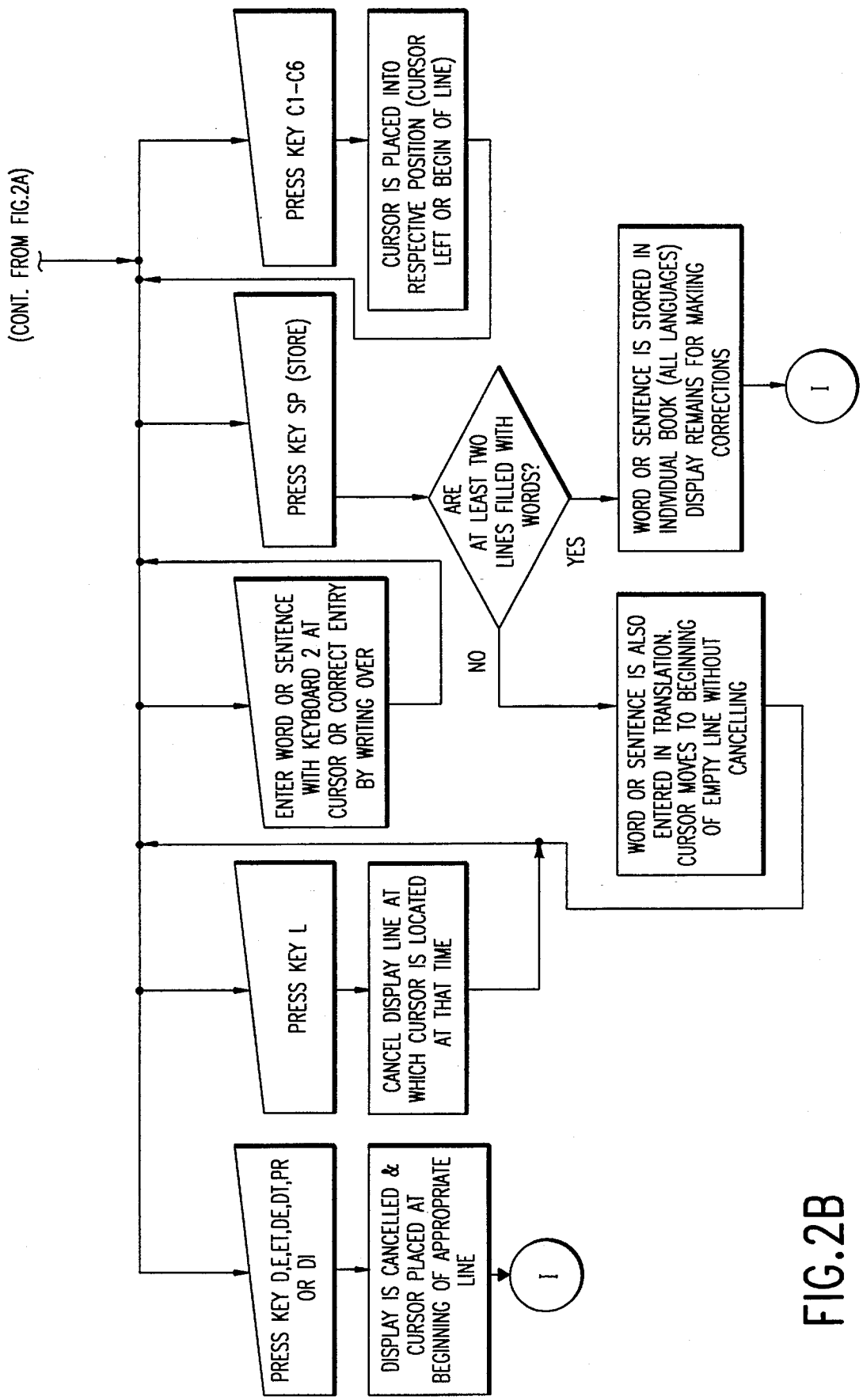

One preferred embodiment of an electronic translating device in accordance with this invention is illustrated in FIG. 1. The electronic translating device comprises a housing 1 which, in the compact design illustrated, is divided into two parts by a hinge (not shown) and can be folded shut when not in use in a manner similar to a notebook or a pocket calculator. A portion of the input unit 2 is similar to a conventional typewriter keyboard, and is located in a portion of the housing 1. A switch-on key 23 for turning on the electronic device and a switch-off key 24 for turning it off are provided as additional keys. A display 3, for example in the form of an LCD, displays the entered or called-up words, fragments of sentences or sentences, and is located in another portion of the housing. In accordance with this preferred embodiment, the display has seven lines of fifty characters each. The remainder of the input unit 2 is also located in the second portion of the device 1, namely several function keys and identification keys which partially frame the display 3. The device is operated with these function keys and identification keys, the specific meanings of which are explained subsequently.

One preferred embodiment of the translating device according to this invention already contains a dictionary stored in memory when the device is first activated by the student. This two language dictionary is therefore integrated into the device as it is manufactured. In one preferred embodiment the dictionary is for translating words or phrases from German into English and from English into German. Generally, in conventional translating devices, this dictionary cannot be changed by the user. However, the translating device according to this invention provides a special operating mode wherein the dictionary can be modified through the keyboard. This mode of operation is activated through the keyboard by a security code.

A function key 5 is provided for using the dictionary. Operation of the dictionary is performed in a manner analogous to conventional electronic dictionaries. When the function key 5 for the dictionary is pressed, any characters on the display 3 are erased and the cursor of the display is placed at the beginning of the first line. The user can now enter the desired word or the desired phrase in either German or English. However, in this preferred embodiment, the user must operate an identification key to identify the language used prior to entry. The identification key 12 indicates that a subsequent entry of a word will be in the German language and identification key 13 identifies the English language. If the identification key 13 for English is pressed, the cursor of the display 3 is placed at the start of the third line, where entry is performed. Thus, a specific line of the display is allocated to each language. If, after a word has been entered, no further entry is made and the entered word is available in the memory, the corresponding translated word is displayed on the line allocated to the corresponding language. For the German language, this is the first line and for the English language the third in this preferred embodiment.

One preferred embodiment of the translating device according to this invention has additional memories. These are required so the user can store individual words and individual sentence fragments or sentences in the respective languages. In the preferred embodiment shown in FIG. 1, a function key 7 is provided to activate the word memory and a function key 6 is provided to activate the sentence memory. The differentiation between words and sentences is made for didactic reasons, and is not necessary for the design of the device. Basically, it is possible to store words and sentences in the same memory.

The self-defined word or sentence memory of the translation device is activated when one of the function keys 6, 7 is pressed. The cursor appears at the start of the appropriate line on the display depending on which language association key 12, 13, 14 was pressed. In a manner similar to that of an integrated dictionary, the translation appears after the words or sentences have been completely entered and the device detects a correspondence with previously stored data. The language into which the translation is to be made can be selected by means of the function keys 8, 9, 10. If no such function key 8, 9, 10 is selected, the translation appears in all stored languages. In one preferred embodiment, the translation device is designed for three languages: German, English and Thai. English is used as an auxiliary language since it is assumed that most teachers of Thai have no knowledge of German, but probably understand the English language. The function key 8 activates the translation German/English, the function key 9 German/Thai and the function key 10 English/Thai. The language identification key 12 is assigned to the German language, key 13 to English and key 14 to Thai.

If the word or sentence entered is not known to the device, i.e. it is not stored, the user can enter the appropriate translation. So that the word can be entered on the line allocated to the respective language, the input unit 2 has cursor keys 15, 16, 17, 18, 19, 20, 21, which are used to move the cursor to the desired place on the display. The new entry can be stored in the pre-selected sentence or word memory by means of a memory key 4. Thus, each word, sentence fragment or sentence newly entered by the user with the input unit 2 and with the aid of the language identification keys 12, 13, 14 is allocated a clearly defined memory space. If the word is entered subsequently in one of the three languages, the corresponding translation previously entered by the student is shown on the display 3.

In one preferred embodiment, two lines are provided for each language on the display 3. Phonetic information can be entered and displayed on the second line. The user can enter and change this phonetic information as desired or keep these lines empty. The Latin script is preferably used for the phonetic information.

The seventh line on the display 3 is used to show the sentence structure. For example, a literal translation into German of a sentence entered in Thai can be displayed so that the different arrangement of the sentence in the foreign language can be seen.

In addition, the translating device has a cancel key 11, with which previously entered data can be changed or cancelled. In one preferred embodiment, only the words, sentences or sentence fragments shown on the display can be changed. Thus the user can influence the amount of data entered at any time.

The preferred embodiment shown in FIG. 1 comprises display elements 22 which inform the user of the function key or identification key which has been activated. These display elements are respectively located in the vicinity of the associated function key. They are arranged in the display 3 in the embodiment shown in FIG. 1.

In one preferred embodiment of the translating device according to this invention, the device turns off automatically after a defined period of time if it is not in use.

In another preferred embodiment, the invention may be designed as a pocket model that can transmit its stored data in a wireless manner by an infrared link to another device or can receive data in a similar manner from another device.

Thus, the translating device in accordance with this invention is used as a learning aid for students of language. They can store newly learned knowledge in the device and can repeat it regularly. Because the device is compact, it can be taken anywhere. Because access to the stored translations is based upon a student's needs, the most required words and sentences are generally repeated. This is unlike the use of instruction books, where usually only the information contained on the foremost page is memorized.

While in the foregoing specification this invention has been described in relation to certain preferred embodiments thereof, and many details have been set forth for purpose of illustration, it will be apparent to those skilled in the art that the invention is susceptible to many additional embodiments and that certain details described herein can be varied considerably without departing from the basic principles of this invention.

I claim:

1. In an electronic translating device having an input unit (2), a multi-line display (3) and at least one memory unit, the input unit (2) comprising a memory key (4), said memory key (4) storing at least one of words, sentence fragments and sentences entered by said input unit (2) in said at least one memory unit and a plurality of identification keys (12, 13, 14) positioned in said input unit (2) assigning the entered words, sentence fragments and sentences to a memory space identifiable with a respective language, the improvement comprising: said multi-line display (3) showing said entered words, sentence fragments and sentences simultaneously in three languages whereby an input of said at least one of said words, sentence fragments and sentences in one language causes a display of a corresponding translation in two other languages from said at least one memory unit.

2. In an electronic translating device in accordance with claim 1, wherein the input unit (2) comprises an allocated said identification key (12, 13, 14) for each language for which the translating device has been designed.

3. In an electronic translating device in accordance with claim 1, wherein the input unit (2) comprises a plurality of function keys (6, 7), said function keys (6, 7) enabling storage of said words, said sentence fragments, and said sentences in separate said memory units.

4. In an electronic translating device in accordance with claim 2, wherein said multi-line display (3) displays at least two display lines per language, phonetic information being displayed on the respective second lines.

5. In an electronic translating device in accordance with claim 1, wherein said at least one memory unit comprises a dictionary for two languages, said languages being retrievable through said input unit (2) by activation of a function key (5) associated with the dictionary and by entry of a word in one of the two languages.

6. In an electronic translating device in accordance with claim 1, wherein said input unit (2) comprises a plurality of function keys (8, 9, 10) whereby entered words, sentence fragments or sentences are compared with stored data in one language, and agreement with the stored translation into the other language selected by said function keys (8, 9, 10) appears on the multi-line display (3).

7. In an electronic translating device in accordance with claim 1, wherein said input unit (2) comprises at least one cancel key (11), whereby stored data can be deleted.

8. In an electronic translating device in accordance with claim 8, wherein said at least one cancel key (11) deletes only the words, sentence fragment or sentences shown on the multi-line display (3).

9. In an electronic translating device in accordance with claim 1, wherein said device is usable as a learning aid.

* * * * *